Sept. 1, 1970 J. F. REUS ET AL 3,526,358

VALUE ENTERING MECHANISM

Filed April 29, 1968 7 Sheets-Sheet 1

INVENTORS.
JOHN F. REUS
GEORGE C. WU
NATHANIEL F. HAWTHORNE

BY Charles R. Lepchinsky
ATTORNEY

Sept. 1, 1970 J. F. REUS ET AL 3,526,358

VALUE ENTERING MECHANISM

Filed April 29, 1968 7 Sheets-Sheet 2

Sept. 1, 1970 J. F. REUS ET AL 3,526,358

VALUE ENTERING MECHANISM

Filed April 29, 1968 7 Sheets-Sheet 3

Sept. 1, 1970 J. F. REUS ET AL 3,526,358

VALUE ENTERING MECHANISM

Filed April 29, 1968 7 Sheets-Sheet 4

VALUE ENTERING MECHANISM

Filed April 29, 1968 7 Sheets-Sheet 5

Sept. 1, 1970 J. F. REUS ET AL 3,526,358

VALUE ENTERING MECHANISM

Filed April 29, 1968 7 Sheets-Sheet 6

Sept. 1, 1970 J. F. REUS ET AL 3,526,358

VALUE ENTERING MECHANISM

Filed April 29, 1968 7 Sheets-Sheet 7

United States Patent Office 3,526,358

Patented Sept. 1, 1970

3,526,358

VALUE ENTERING MECHANISM

John F. Reus, Hayward, George C. Wu, Newark, and Nathaniel F. Hawthorne, Alameda, Calif., assignors to The Singer Company, a corporation of New Jersey Filed Apr. 29, 1968, Ser. No. 725,006

Int. Cl. G07g *1/00;* G06c *7/02*

U.S. Cl. 235—101 15 Claims

ABSTRACT OF THE DISCLOSURE

A full-key keyboard for a postage meter with ordinally arranged rows of value keys, the keys in each row representative of values "1" to "9" in the tenths of cents order, "1" to "9" in the units of cents order and the hundredths or dollar order and "10" to "90" in the tens of cents order of the keyboard. A selected value key in each ordinal row, upon depression, is latched in depressed position and thereafter prevents depression of any other key in the corresponding row. Upon operation of the latching mechanism for each depressed key, a normally latched value selection slide is released for differential adjustment in accordance with the value represented by the depressed key. With the adjustment of the selection slide, the value is visually indicated on selection setup wheels and mechanism is adjusted for entry of the value in an ascending and descending register. When a change of value, or values, is desired, a "CLEAR" key is operated to effect release of previously depressed keys, return the selection slides to latched position and restore the setup wheels to "0" registration.

BACKGROUND OF THE INVENTION

Although full-key keyboards have been in use in calculating machines and the like, their use in postage meters has never been deemed practical. In the full-key keyboards commonly known today, each key in an ordinal row of keys is latched in depressed position and released upon depression of any other one key in the same row, whether it be intentional or inadvertent. In some instances, two keys in the same row may be inadvertently depressed and latched simultaneously with a possible erroneous registration resulting therefrom. In a postage meter application, an erroneous value selection results in the printing of an incorrect indicium, or postmark, which may be costly to the mailer.

Most postage meters in use today have either of two types of selection mechanisms, a plurality of ordinally arranged selection wheels, which are rotatable to a desired value, or denominationally arranged levers, rockable to a selected value setting, neither the wheels nor the levers being locked in said position, except during the operation of the meter. With either type of selection mechanism, the value selection may be inadvertently changed while working in the area of the postage meter, and unless strict attention is given to the value setting at all times, when the meter is in use, many pieces of mail matter may pass through the postage machine bearing an incorrect postmark.

SUMMARY OF THE INVENTION

In the use of our invention, a four-bank postage meter is provided with a four-order, full-keyboard selection in which a latching means associated with each order of the keyboard becomes effective upon depression of a selected value key in each order to latch the key in its depressed condition, and to release an associated slide for differential movement in accordance with the representative value of the key. The differential movement of the slide controls adjustment of the type wheels in the meter print-head and determines the registration of the value in each of two registers upon operation of the meter.

In order to release a latched key or keys to the normal, or nondepressed, position, a "CLEAR" key must be operated, the operation of which key also serves to effect restoration of the differentially moved selection slide, or slides, to a normally inactive, or zero, representative position. Whether or not the operation of a "CLEAR" key was intentional, there would be no value registration in the keyboard, therefore, no loss of postage. Accordingly, it is an object of the present invention to provide an improved selection mechanism for a postage meter wherein a depressed key in each keyboard order is invariably locked in the depressed position, releasable only by a "CLEAR" key.

It is another object of the present invention to provide a full-key keyboard for a postage meter including indicator dials therefor.

Other objects and advantages will appear in the following description of a preferred embodiment as illustrated in the accompanying drawings, in which.

Figure 12:
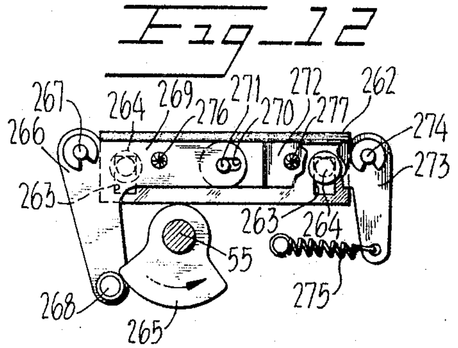
Figure 13:
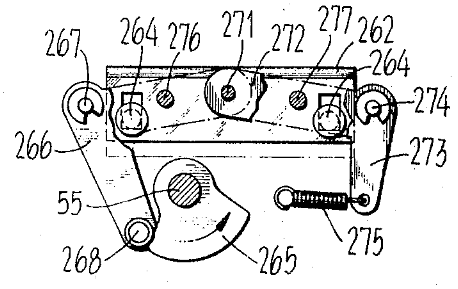
Figure 4:
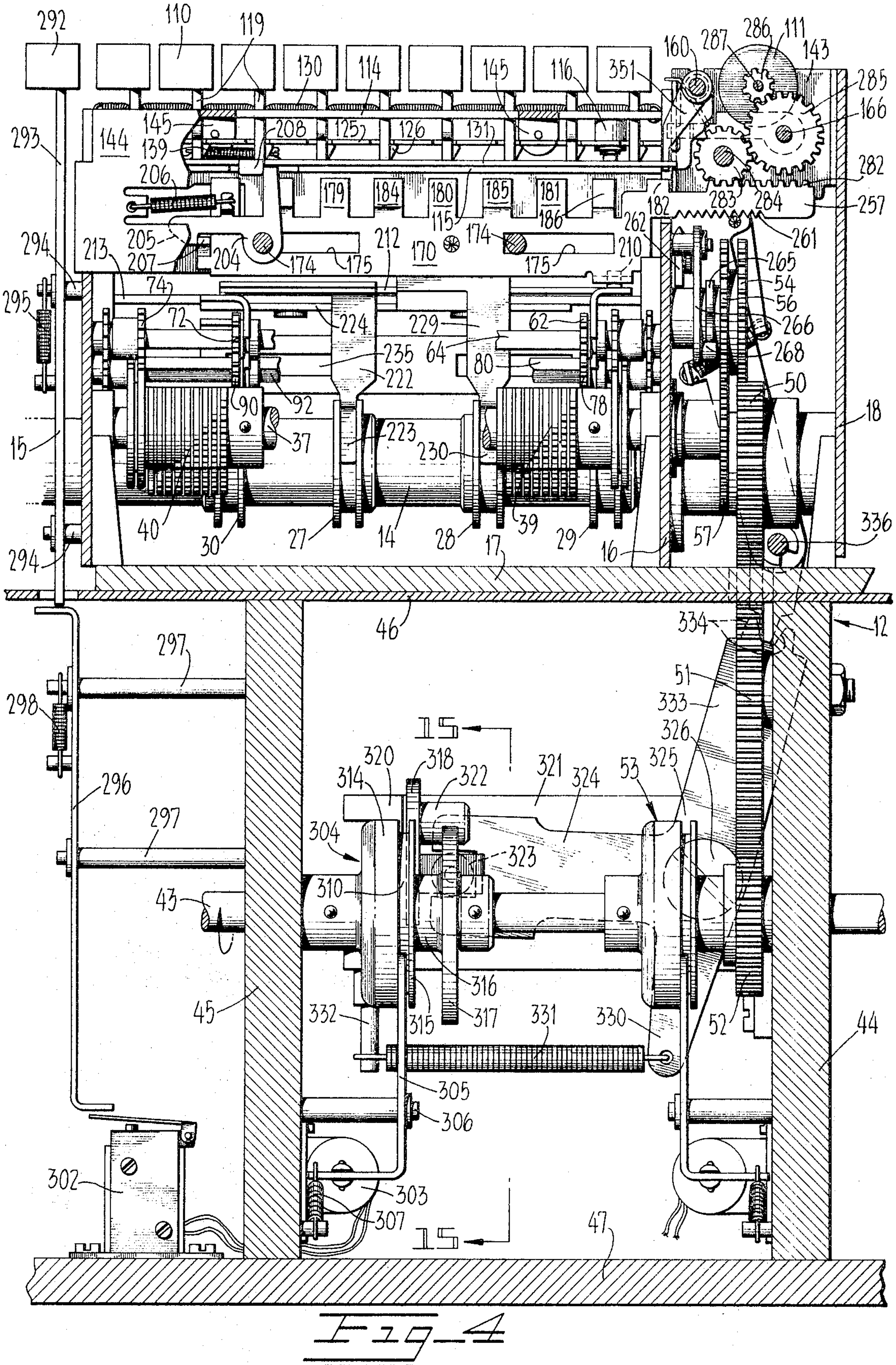
Figure 5:
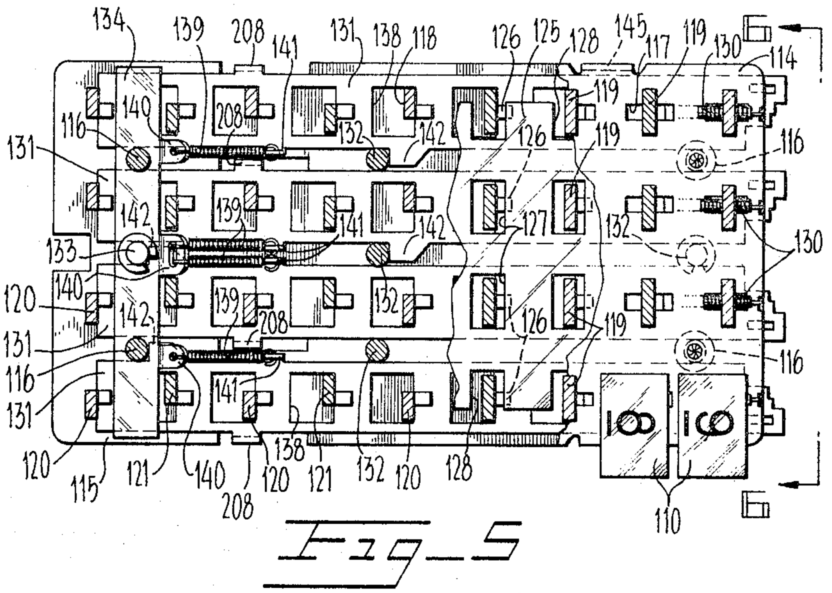
Figures 6, 7:
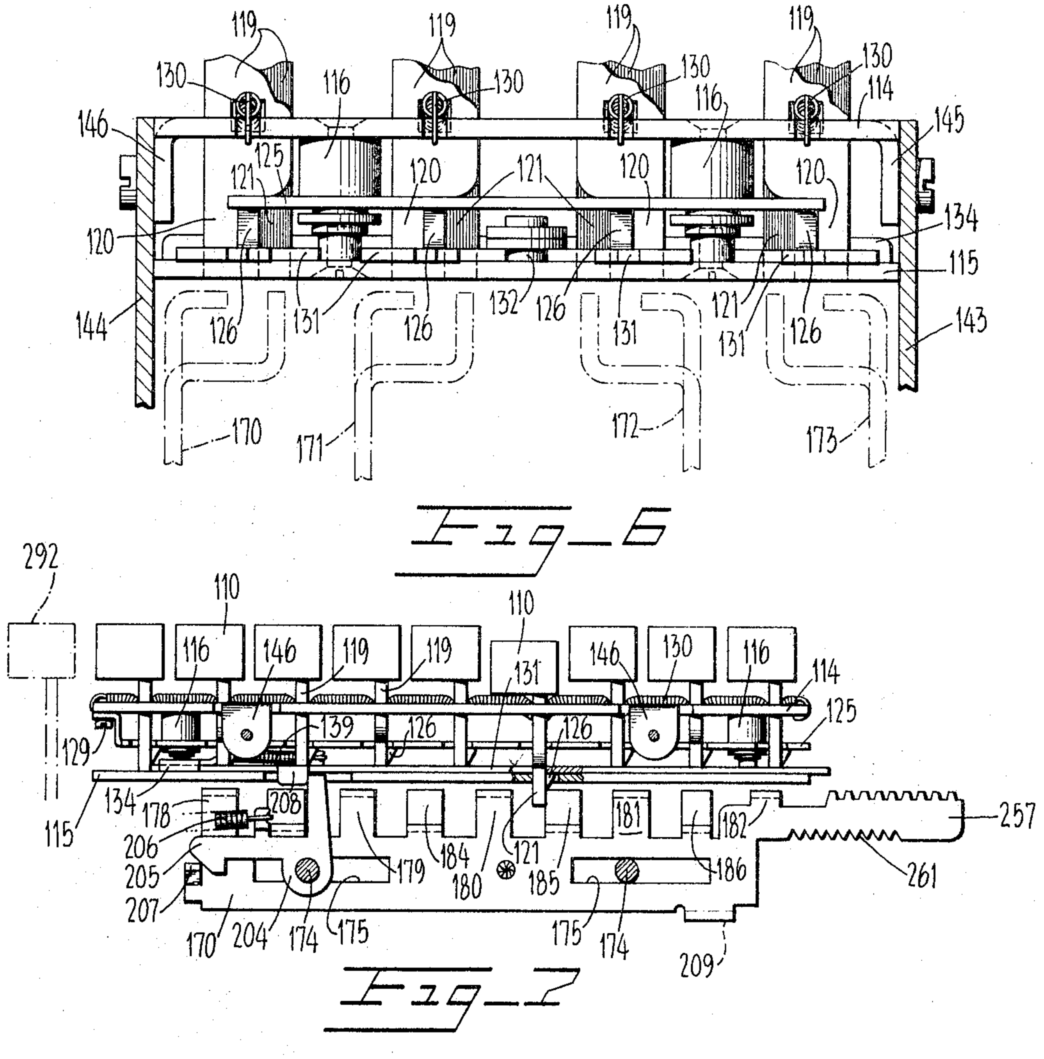
Figure 9:
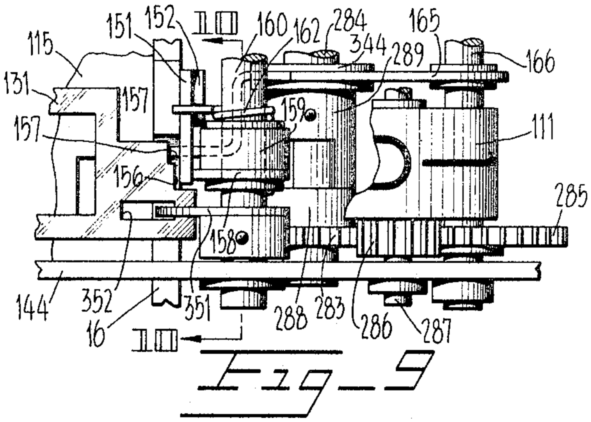
Figure 10:
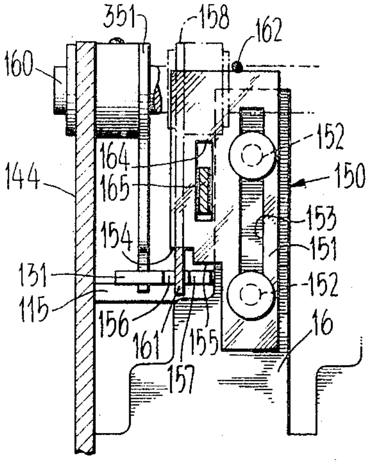
Figures 8, 11:
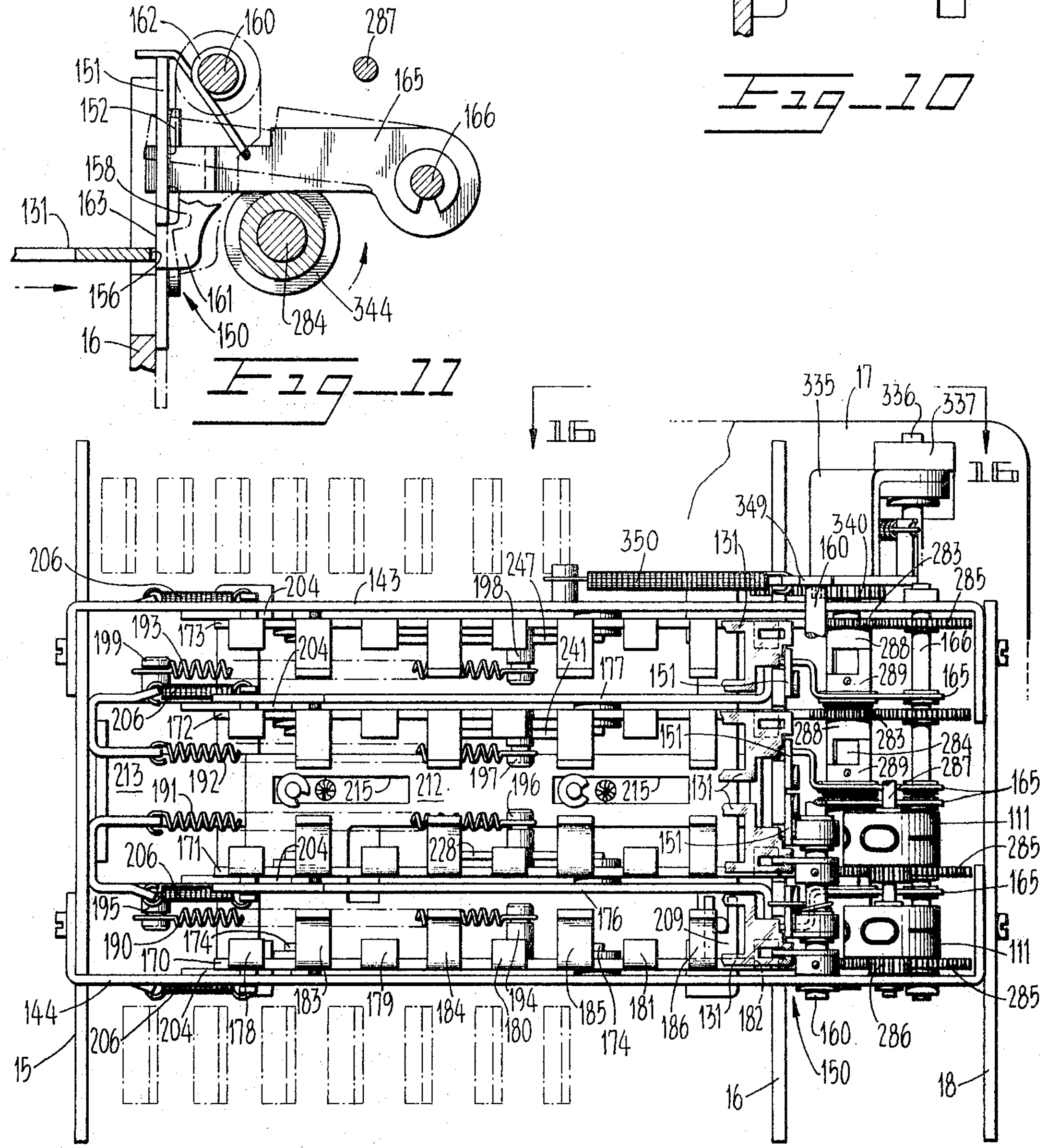
Figure 14:
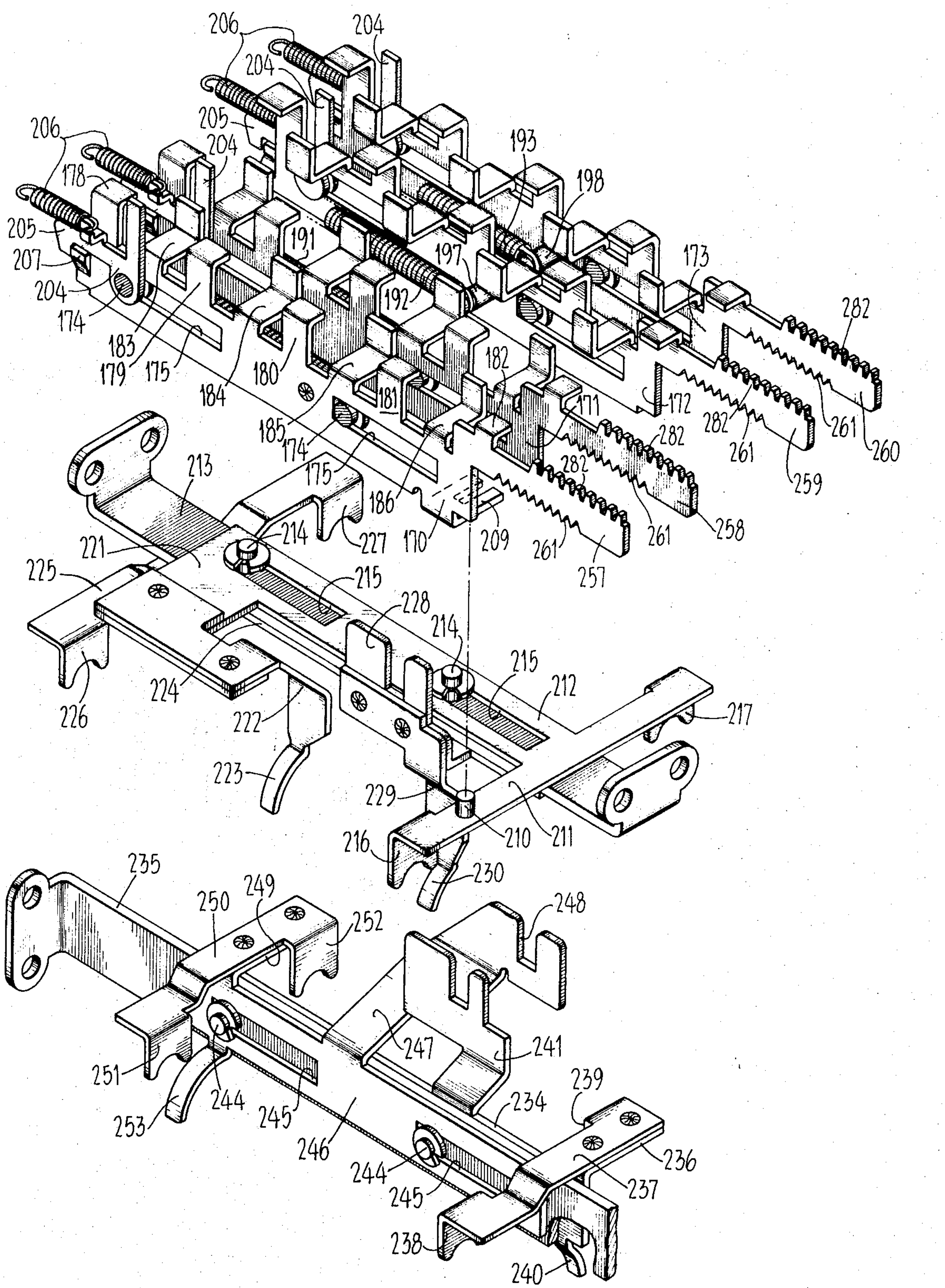
Figures 15, 16:
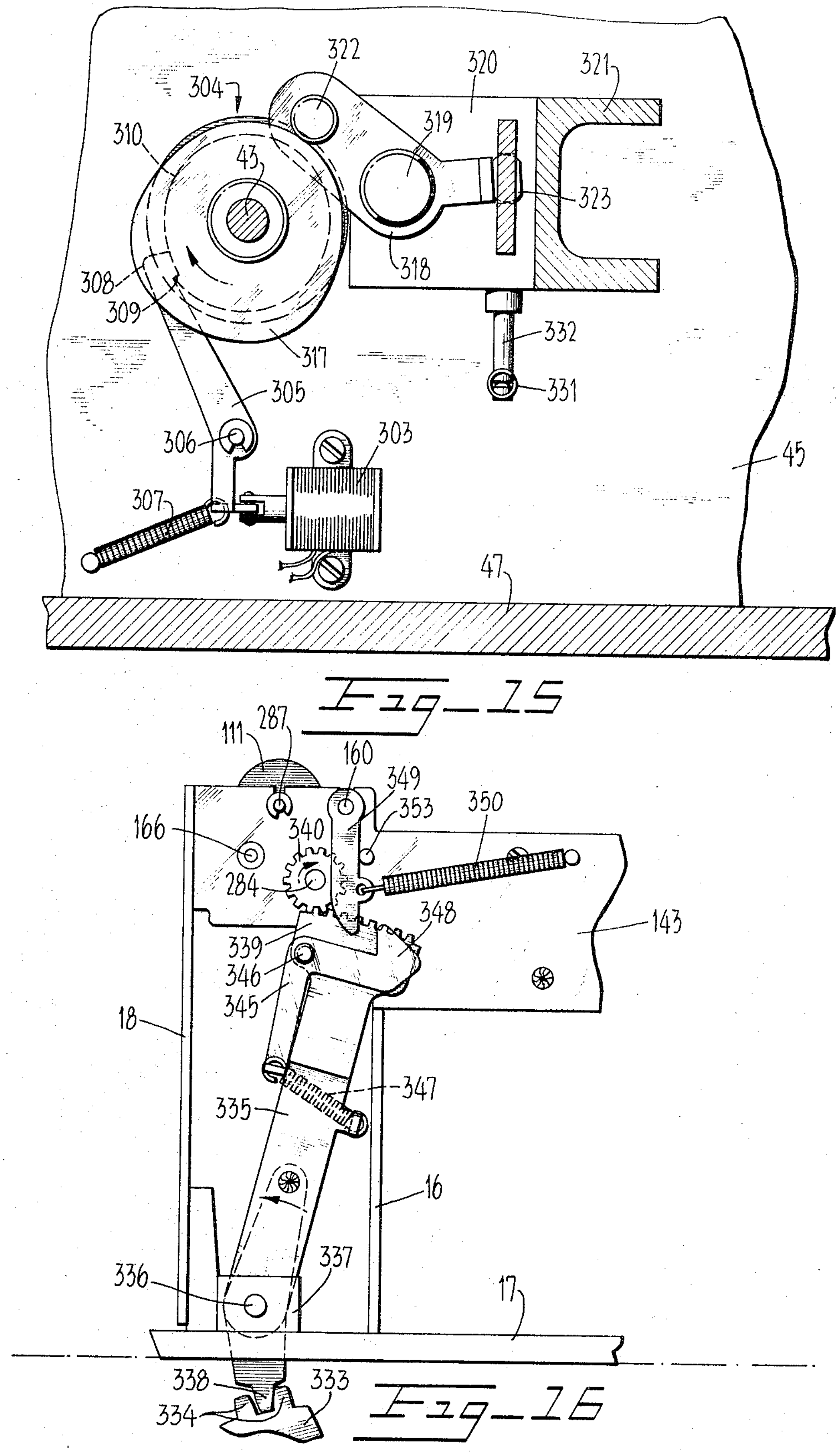

FIG. 4 is a fragmentary sectional elevational view of the postage metering machine, FIG. 5 is a fragmentary sectional plan view of the keyboard, FIG. 6 is an end elevational view of the keyboard, the view being taken on the plane indicated by lines 6—6 in FIG. 5, FIG. 7 is a side elevational view of the keyboard, showing an actuated selection slide, FIG. 8 is a plan view of the selection mechanism with the keyboard removed, FIG. 9 is a fragmentary plan view of one keyboard order, showing the indicator dial and restore mechanism associated therewith, FIG. 10 is an enlarged detail of the ordinal keyboard locking mechanism, the view being taken on the plane indicated by lines 10—10 in FIG. 9, FIG. 11 is an enlarged detail of an ordinal keyboard lock release, FIGS. 12 and 13 are detailed views of the cyclic latch for the selection slides, FIG. 14 is an isometric projection of the selection mechanism, FIG. 15 is a fragmentary sectional elevational view of the postage metering machine base showing the keyboard clear control cam, the view being taken on the plane indicated by line 15—15 in FIG. 4, and FIG. 16 is an elevational view of the keyboard clear actuating mechanism, the view being taken on the plane indicated by lines 16—16 in FIG. 8.

The present invention is shown as embodied in a postage meter of a known type of construction, having a cyclically rotatable print-head 10 (FIG. 2) housed within cover 11 (FIG. 1), the meter being removably supported upon base portion 12 which serves to house the drive mechanism for the meter and supports the letter table 13. Mail matter is passed along the top surface of the letter table 13 beneath the forwardly extended portion of the meter cover 11 for the printing of a postmark thereon by a print-head 10. The print-head 10 carries the usual printing dies, such as indicia die, town circle die, and the slogan die, as well as the numeral type wheels for the printing of a selected postage value and the type wheels for the printing of a date, all of which are not shown since they serve no part of the present invention.

The print-head 10 (FIG. 2) is secured on one end of the shaft 14 suitably journalled at its other end in auxiliary frame member 18 and intermediate its ends in end frames 15 and 16, frame members 15, 16 and 18 being secured in spaced parallel relationship on meter base 17. Extending parallel to the axis of the shaft 14 and in the peripheral surface thereof, is the channel 22 which provides a guide way for the juxtapositioned rack slides 23, 24, 25 and 26. A selective differential adjustment of each of the rack slides 23, 24, 25 and 26 controls the adjustment of the postage value type-wheels in the print-head 10, rack slide 23 controlling the adjustment of the tenths of cents type-wheel, rack slide 24, the adjustment of the units of cents type-wheel, rack slide 25, the tens of cents type-wheel and rack slide 26, the hundredths, or dollar, type-wheel. In order to effect a differential adjustment of each of the rack slides 23, 24, 25 and 26 axially of shaft 14, a series of flanged collars 27, 28, 29 and 30 are supported for sliding movement axially of the shaft 14, collar 27 being secured to rack slide 23, collar 28 secured to rack slide 24, collar 29 secured to rack slide 25 and collar 30 being secured to rack slide 26. The differential adjustment of the rack slides 23, 24, 25 and 26 and the respective associated type-wheels corresponds to the values set up in an ordinal value-entering mechanism, generally indicated at 34 in FIG. 1.

With the differential adjustment of the flanged collars 27, 28, 29 and 30, and their associated rack slides 23, 24, 25 and 26, respectively, a similar adjustment of the registering mechanism is effected to control the registration of the value set up in the value-entering mechanism 34 in the ascending register 35 and descending register 36. For this purpose, a pair of actuator shafts 37 and 38 (FIG. 2) are disposed in axially parallel relationship on either side of, and axially parallel to, print-head shaft 14. Each actuator shaft is journalled at its left-hand, or forward, end in end frame 15, and at its rearward end in end frame 16. Actuator shaft 37 carries two identical stepped toothed drums 39 and 40, while a pair of similar stepped toothed drums 41 and 42 are secured on actuator shaft 38.

Figure 3:
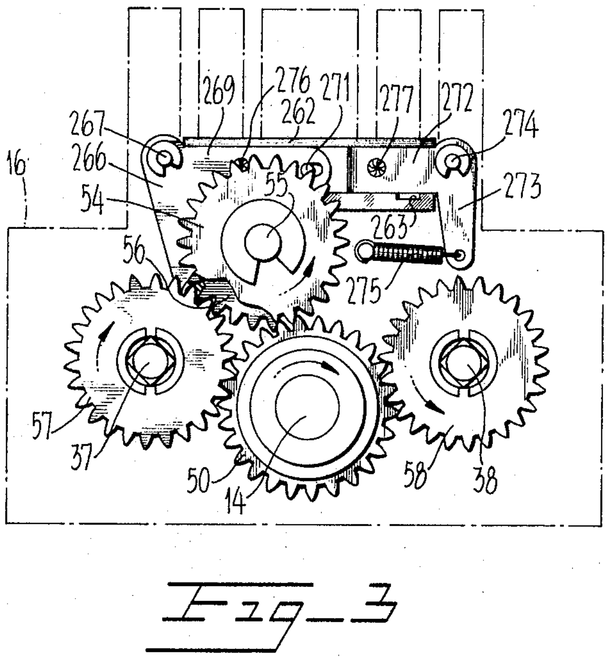
FIG. 3 is an elevational view of the meter drive mechanism.

Referring to FIGS. 3 and 4, actuator shafts 37 and 38 are driven by print-head shaft 14 which, in turn, is driven by the motor driven shaft 43 suitably journalled in frame members 44 and 45 secured to the base plate 47 of base portion 12. Upon securing the meter in operative position on top cover 46 of the base portion 12, gear 50 secured on print-head shaft 14 is enmeshed with idler gear 51 which, in turn, is enmeshed with drive gear 52, secured to the driven side of the cyclically operable clutch 53 of well-known construction. The cyclic operation of the clutch 53 is under the control of a piece of mail matter as it is introduced into the metering machine along letter table 13. For each cyclic rotation of the print-head shaft 14, a synchronous cyclic rotation is imparted to each of the actuator shafts 37 and 38. For this purpose, gear 50 on shaft 14 is enmeshed with the gear 54 secured on one end of a sleeve rotatable on stub shaft 55 supported on end frame 16. At its other end, the sleeve carries a similar gear 56 which is enmeshed with gear 57 secured on actuator shaft 37. Likewise, gear 50 on shaft 14 is enmeshed with gear 58 secured on actuator shaft 38. Since each of the gears 50, 54, 56, 57 and 58 are of equal pitch diameter, each revolution of gear 50 in a clockwise direction (FIG. 3) imparts a similar angular rotation to actuator shaft 38 in a counter-clockwise direction, and through intermediate gears 54 and 56, imparts a similar angular clockwise rotation to actuator shaft 37.

Upon entry of a postage value in the value-entering mechanism 34, and upon initiation of a cycle of meter operation, the value so entered is registered in the ascending register 35 and the descending register 36. To this end, a pair of selection gears for each order of the value-entering mechanism 34 are adjusted differentially relative to the corresponding actuator drums 39, 40, 41 and 42 by means to be described hereinafter. Adjustment of the selection gears 62 and 63 (FIG. 3) is under the control of the tenths of cents order of the value-entering mechanism 34 and are nonrotatably and axially slidable on respective square shafts 64 and 65, relative to the respective actuator drums 39 and 41. Square shaft 64 is journalled, at its one end, in end frame 16 and the opposite round-end portion of the shaft is journalled in a suitable bearing 66 supported on bracket 67. Square shaft 65 is similarly journalled in end frame 16 and bushing 68 supported on bracket 69. For each differential adjustment of selection gears 62, 63 for the values ".001" to ".009" the gears are positioned to mesh with the appropriate sector of a corresponding actuator drum, as seen in FIG. 4. Thus, a similar number of angular increments of rotation is imparted to each of the selection gears 62 and 63 in accordance with the value entered in the tenths of cents order of the value-entering mechanism 34 and is effective by means of gears 70 and 71, secured on respective square shafts 64 and 65 to cause registration of the value in the tenths of cents order dial of the corresponding registers 35 and 36.

Similarly, selection gears 72 and 73 associated with the units of cents order of the value-entering mechanism 34 are differentially adjustable axially of respective square shafts 74 and 75 relative to the corresponding actuator drums 40 and 42. Each of the square shafts 74 and 75 is journalled at its one end in the end frame 15 and, at its other end, in bushings 66 and 68, respectively. Each angular increment of rotation of selection gears 72 and 73 is transmitted by means of respective gears 76 and 77 to the units of cents order dials of the corresponding registers 35 and 36.

In order to effect the registration of a tens of cents value, the selection gears 78 and 79 are differentially slidable axially of the respective square shafts 80 and 81 relative to the corresponding actuator drums 39 and 41. At its one end, each of the square shafts 80 and 81 is suitably journalled in end frame 16 and, at the other end, the round end portion of the shafts are suitably journalled, respectively, in bushings 82 and 83, carried by respective brackets 84 and 85. The registration of a tens of cents value in the corresponding dial of register 35 is effected by means of gear 86, secured on square shaft 80, and idler gear 87 rotatably mounted on a sleeve on square shaft 74. Similarly, each angular increment of rotation of selection gear 79 is effective through gear 88, secured on square shaft 81, and idler gear 89, rotatable on a sleeve on square shaft 75, to cause registration of the tens of cents value in the corresponding ordinal dial of the register 36.

Likewise, to effect a registration of the hundredths order, or dollar, value set up in the value-entering mechanism 34 into each register 35 and 36, the respective selection gears 90 and 91 are differentially moved axially of the corresponding square shafts 92 and 93 relative to the respective actuator drums 40 and 42. Each of the square shafts 92 and 93 is journalled, at its one end, in end frame 15 and, at the other end, in respective bushings 82 and 83. Each angular increment of rotation of selection gear 90 is transmitted by way of gear 94 through idler gear 95 to the hundredths order dial in the register 35. Similarly, gear 96 associated with selection gear 91 and secured on square shaft 93, serves through idler gear 97 to effect registration of the hundredths order, or dollar, value in the corresponding dial of register 36.

Each of the registers 35 and 36 is of conventional construction and each includes a tens-transfer mechanism of a well-known type. The ordinal dials of the register 35 are rotatably supported upon shaft 102 mounted at its one end in end frame 15 and, at its other end, in bracket 103. Similarly, the ordinal dials of the register 36 are rotatably supported on shaft 104 secured at one end in end frame 15 and, at its other end, in bracket 105.

Figure 1:
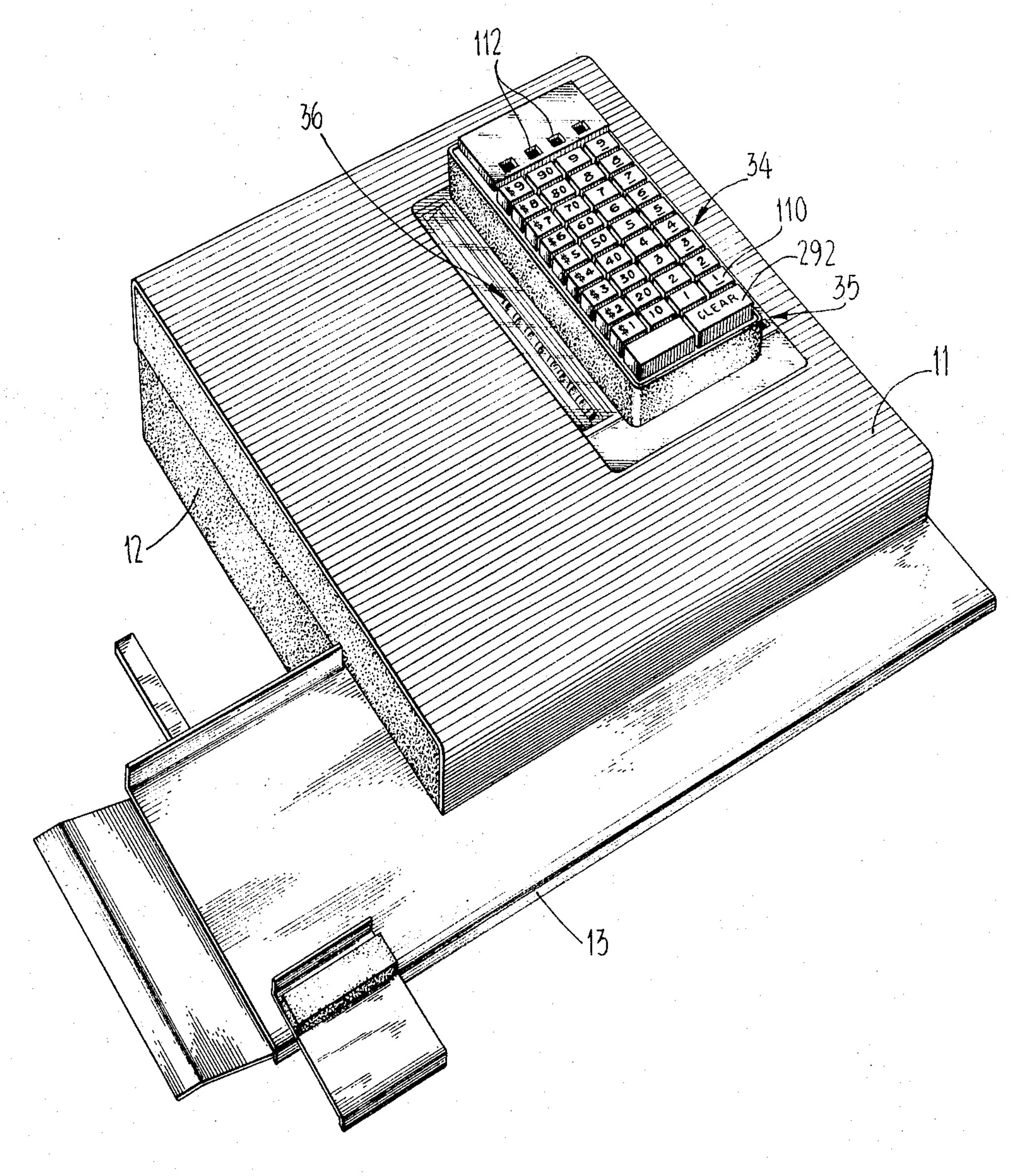
FIG. 1 is an oblique plan view of a postage metering machine.

In a postage meter of the type herein disclosed, commonly referred to as a four-bank meter, the value-entering mechanism 34 includes a tenths of cents order, a units of cents order, a tens of cents order, and a hundredths, or dollar, value order. In the present invention, each of these orders is comprised of a row of nine value keys 110, representative of values from "1" to "9." Upon the entry of a postage value in the value-entering mechanism 34, i.e., the depression of a value key 110 in one or more orders, the value of a key so depressed is immediately registered in the indicator dial 111 of the corresponding order (FIGS. 4, 8 and 9) and is visually indicated in the corresponding dial window 112 (FIG. 1). At the same time, a key latch slide associated with each order, becomes effective to release a normally latched selection slide, or rack, in the corresponding order which becomes effective to accordingly adjust the value type wheels in the print-head 10 and to differentially position the associated selection gears for registration of the value in each of the registers 35 and 36.

In the improved value-entering mechanism of the present invention, the keyboard frame comprises an upper flat plate 114 and a lower flat plate 115 (FIGS. 4, 5, 6 and 7), secured in spaced parallel relationship to each other by a series of spacers 116. Each of the plates 114 and 115 are of somewhat of an elongated rectangular shape and are provided with apertures 117 and 118, respectively, arranged in ordinal rows extending longitudinally of the plates. The apertures 117 are in the form of a Greek cross, or plus symbol, while the apertures 118 in the lower plate 115 are in the form of a right angle. One part of that portion of the aperture 117 extending longitudinally of the plate 114 in each order thereof, is in registry with one leg of the corresponding angularly-formed aperture 118 in the lower plate 115. In an alternate arrangement in each ordinal row of apertures 118 in lower plate 115, one part of the transverse portion of each aperture 117 is in registry with the other leg of the corresponding angularly-formed aperture 118, for a purpose to be hereinafter described.

Each key 110 comprises a flat stem portion 119 slidably supported in mutually-registering apertures in the upper and lower plates 114 and 115, with the major cross-sectional dimension of the stems 119 slidably disposed in the transverse portion of the apertures 117 in each ordinal row. At its lower end, each key stem 119 is provided with an extension of a reduced width with respect to the upper portion of the key stem. It will be noted that the extension 120 of the "1," "3," "5," etc. keys in each order (FIGS. 5 and 6), is slidably disposed in the transverse leg of the corresponding angularly-formed aperture 118 extending in one direction, while the extension 121 of the alternate key stems in each ordinal row is guided for sliding movement in the oppositely disposed transverse leg of a corresponding angularly-formed aperture 118.

Intermediate key supporting plates 114 and 115 is a plate 125, rectangular in shape and slidably supported on the upper reduced diametral portion of the spacers 116. Each extension 120 and 121 of a corresponding key stem 119 carries an extruded camming tooth 126, which serves to limit the upward movement of each key stem 119. In assembly, each key stem 119 of the two intermediate rows of keys 110 is passed through a suitable rectangular aperture 127 in the plate 125. Similarly, the key stems 119 of the two outer rows of keys 110 and the associated camming teeth 126 are passed through suitable notches 128 in the plate 125. Thereafter, plate 125 is moved to the left in FIGS. 5 and 7 and is secured in this moved position by means of a screw 129 threaded in the top plate 114 and is additionally secured on spacers 116 by means of clips 122. Thus, each of the keys 110 is locked in position for endwise movement in plates 114 and 115. Coil spring 130 is provided for each row of keys 110 extending longitudinally of a corresponding row passing through suitable apertures in each key stem 119 and secured at each end to plate 114. The coil springs 130 serve to resiliently urge each of the keys 110 of each row upwardly to the non-depressed position determined by the engagement of the projected end of the associated tooth 126 with the lower surface of plate 125, as seen in FIGS. 4 and 7.

A series of key-latching slides 131 are disposed on the upper surface of the lower keyboard plate 115 and extend longitudinally of the plate, there being one latch slide for each ordinal row of value keys 110. The latching slides 131 are maintained in spaced parallel relationship on lower plate 115 by means of the lower reduced diametral end portion of spacers 116 and a series of headed pins 132. The latching slides 131 are also maintained in sliding engagement with the surface of the plate 115 by means of a shoulder formed by the reduced diametral end portion of the spacers 116 and the headed portion of pins 132. In addition to maintaining the parallel relationship of the latching slides 131, the lower reduced diametral end portion of the left-hand spacer 116 (FIG. 5) as well as a pin 133, serve to retain a flanged bar 134 in position overlying the left end portion of the slides.

A series of substantially square apertures 138 are formed in each latch slide 131, equally spaced longitudinally of the slide. Associated with each latching slide 131 is a relatively light spring 139 supported at its one end on a corresponding angularly upwardly formed ear 140 carried by bar 134 and at its other end in an ear 141 formed upwardly at a right angle to the corresponding latching slide 131. Normally, each of the springs 139 serves to resiliently urge the associated latching slide 131 to the position shown in FIG. 5 wherein the shoulder of a projection 142 of the upper pair of slides engages corresponding pins 132 and the shoulder of the projection 142 of each of the lower slides engages the corresponding pin 133 and lower portion of a spacer 116. In this position of the slides 131, the right-hand edge of each aperture 138 abuts the face of the corresponding extension 120 or 121 of key stems 119. As seen in FIGS. 4, 6 and 8, the keyboard, as a unit, is supported within the meter between spaced parallel side frame members 143 and 144, each of which members 143 and 144 is suitably secured at its respective ends on end frame member 15 and auxiliary frame member 18. To this end, a pair of spaced ears 145 are formed downwardly at a right angle along one longitudinal edge of top plate 114 and a similar pair of ears 146 are formed downwardly at a right angle to the other longitudinal edge of the plate 114. Suitable screws are threaded into the pairs of ears 145 and 146 to secure the keyboard to the respective side frame members 143 and 144.

As a selected value key 110 is depressed, the camming tooth 126 associated therewith moves the corresponding ordinal latching slide 131 to the right, as viewed in FIGS. 5 and 7. Upon further depression of the key 110, the associated spring 139 immediately restores latching slide 131 to its normal position when the tooth 126 of the depressed key engages the lower surface of the latching slide, thereby maintaining the key in its depressed position. At this time, a locking mechanism, generally indicated at 150, becomes effective to lock the latching slide 131 in the key-latching position shown in FIG. 7 to prevent release of the depressed value key 110. Also, as a value key is depressed and the associated key latching slide 131 moves to the right (FIG. 7), a corresponding ordinal selection rack is released for differential movement in accordance with the value of the key depressed. As the selection rack moves to the left, as viewed in FIG. 7, a corresponding ordinal indicator dial registers the selected value. At the same time, a selection guide mechanism, under the control of the differentially moved selection rack, becomes effective to differentially adjust the associated selection gears, relative to the corresponding actuator drum and to adjust the corresponding value type-wheel in the print-head 10.

Referring now to FIGS. 9, 10 and 11, and inasmuch as the key latching slide lock mechanism 150 is identical for each ordinal row of keys, only that mechanism associated with one order will be described. A lock bar 151 is slidably supported on end frame member 16 by means of a pair of spaced headed pins 152, secured on frame member 16 and engaged in an elongated slot 153 of the lock bar. A pair of steps 154 and 155 are formed in a portion of lock bar 151 and correspond to a pair of steps 156 and 157, respectively, formed in the end of the associated latching slide 131. An arm 158 is secured on a hub 159, rockably supported on a shaft 160 journalled at its ends in side frame members 143 and 144. At its lower end, arm 158 is provided with a nose projection 161, the top edge of which is normally engaged by the step 154 of the lock bar 151, under the urgency of a torsion spring 162. One end of the spring 162 rests on the top edge of the lock bar 151, while its other end is disposed or bears against the right-hand, or rearward, edge of the arm 158. In the normally engaged position of the nose 161 of arm 158 with locking bar 151, the vertical edge 163 of the nose 161 is positioned adjacent and in the path of movement of the edge surface of the step 156 of the key-latching slide 131.

As a value key 110, for example, the "6" key, is depressed, as seen in FIG. 7, and upon the movement of the associated latching slide 131 to the right, the arm 158 is rocked counter-clockwise to the position shown in phantom line in FIG. 11 to remove the nose 161 thereof from beneath the step 154 of the lock bar 151. Immediately following the removal of the nose 161 from beneath the step 154, torsion spring 162 urges lock bar 151 downwardly, whereupon step 155 of the locking bar 151 is moved into the path of travel of the step 157 of key-latching slide 131. As the latching slide 131 returns to its key-latching, or normal, position, the nose 161 of the arm 158 comes to rest against the lock bar 151. As the lock bar 151 is spring-urged downwardly, the extent of its travel is determined by the engagement of the top inner edge of an aperture 164 in the bar 151 with the top edge of the offset end portion of an arm 165 rockably supported on a shaft 166 which is journalled at its respective ends in frame members 143 and 144. The arm 165, when rocked, serves a purpose to be hereinafter described.

It will be noted that the depth of the step 157 in the end of the key-latching slide 131 is of a dimension such that, upon movement of the slide 131 to the right in FIG. 9 to release latch arm 158, an area of the stepped portion 157 of the slide substantially the thickness of the lock bar 151, moves beneath the shoulder 155 of the bar. Thus, upon release of the bar 151 and during its initial movement under the influence of the spring 162, the step 155 engages the top surface of the slide 131. However, tension of the spring 139 associated with the slide 131, is sufficient to restore the slide 131 to the leftmost or key-latching position shown in FIG. 7, overcoming the friction between slide 131 and bar 152, thereby permitting bar 151 to drop into blocking relationship with the step 157 of the slide 131. It can be seen, therefore, that the lost motion between the step 157 and the lock bar 151, in blocking position, is not sufficient to permit the depression of another value key in the same ordinal row as the depressed key.

As explained hereinbefore, the depression of a value key 110 in each ordinal row of keys and the resulting movement of the associated key-latching slide 131 becomes effective to control the differential adjustment of the corresponding ordinal selection gears for the registration of a value in each of the registers 35 and 36 and to control a differential adjustment of the corresponding ordinal type-wheel in the print-head 10. For this purpose, a selection rack 170, 171, 172 and 173 (FIGS. 4, 7, 8 and 14) is provided, one for each ordinal row of keys, i.e., the tenths of cents order, the units of cents order, the tens of cents order, and the dollar order, respectively. Selection rack 170 is mounted for endwise sliding movement upon the side frame member 144 by means of pins 174 engaged in slots 175 of the rack. Similarly, selection rack 171 is mounted for endwise sliding movement on a support plate 176, secured at its respective ends to end frame members 15 and 16. Selection rack 172 is likewise mounted for endwise movement on a support plate 177, secured at its respective ends to end frame members 15 and 16. In a like manner, selection rack 173 is supported for endwise movement on side frame member 143.

Each of the selection racks 170, 171, 172 and 173 is provided a series of stop members, one for each of the keys 110 in a corresponding ordinal row of keys. The stop members for each of the racks are identical in conformation and arrangement, it is, therefore, believed that a description of rack 170 will suffice for all. Each of the stop members 178, 179, 180, 181 and 182 extend upwardly, as seen in FIG. 14, having their end portion formed over a right-angle thereto and disposed in a common plane parallel to the plane of movement of the rack. These stop members cooperate with the extension 120 of the key stems 119 of value keys "1," "3," "5," "7" and "9," respectively, upon the selective depression of each key. On the other hand, the stop members 183, 184, 185 and 186 are offset with the upwardly extended end portion adapted to cooperate with the extension 121 of the key stems 119 of each depressed value key "2," "4," "6" and "8."

Each of the selection racks 170, 171, 172 and 173 (FIG. 8) is normally urged to the left from a normally latched position by means of respective relatively strong springs 190, 191, 192 and 193. Spring 190 is supported at its one end on a pin 194, secured on selection rack 170 and, at the other end, on a pin 195, carried by support plate 176. At its one end, spring 191 is supported on a pin 196 carried by selection rack 171 and, at its other end, is supported in the free end of the U-shaped end portion of the support plate 176. Similarly, a pin 197 secured on selection rack 172, supports one end of spring 192, which, at its other end, is supported in the free end of the U-shaped end portion of support plate 177. Selection rack 173 carries a pin 198 supporting one end of the spring 193, the other end of which is supported on pin 199 secured on support plate 177.

Associated with each of the selection racks 170–173 is a latching pawl 204, rockably mounted on the left-hand selection rack supporting pin, such as that shown at 174 in FIGS. 4, 7 and 14. The horizontally disposed arm of each pawl, or latching bellcrank, 204 is provided with a hook end portion 205 which is normally urged counter-clockwise by a spring 206 into engagement with an ear formed on the left end of each of the corresponding selection racks, such as the ear 207 on rack 170, as seen in FIGS. 4 and 14. In order to release each selection rack 170–173 to the urgency of its respective spring 190–193, the free end of the upwardly extending arm of each latching bellcrank 204, abuts the leading edge of an ear 208 formed downwardly at a right-angle to each ordinal key-latching slide 131. Upon clockwise rocking movement of each bellcrank 204 (FIGS. 4 and 7) the associated selection rack is released to the influence of its spring for differential adjustment in accordance with the value key depressed. To this end, as a selected value key 110, in each ordinal row of keys, is depressed, the associated camming tooth 126 moves the corresponding key-latching slide 131 to the right (FIGS. 4 and 7). During this movement of the latching slide 131, the ear 208 formed thereon rocks the associated latching bellcrank 204 clockwise to release the corresponding selection rack for a differential adjustment determined by the abutment of the appropriate stop member on the released rack with the key stem extension 120 or 121 of the depressed value key 110, as exemplified by the depressed "6" value key in the tenths of cents order, as seen in FIG. 7. The length of the key stem 119 and its extension 120 or 121 is such that the key extension of a depressed value key is moved into the path of movement of the appropriate stop member prior to the release of the corresponding selection rack, the appropriate stop member being 185 of the selection rack 170 in the example shown in FIG. 7. For this reason, and as explained hereinbefore, the key extensions 120 and 121 of alternate keys in each ordinal key row, are staggered, as seen in FIG. 5 to prevent interference by the stop members of the corresponding selection racks or the restriction of the movement of the selection racks by certain of the keys in each key row.

Figure 2:
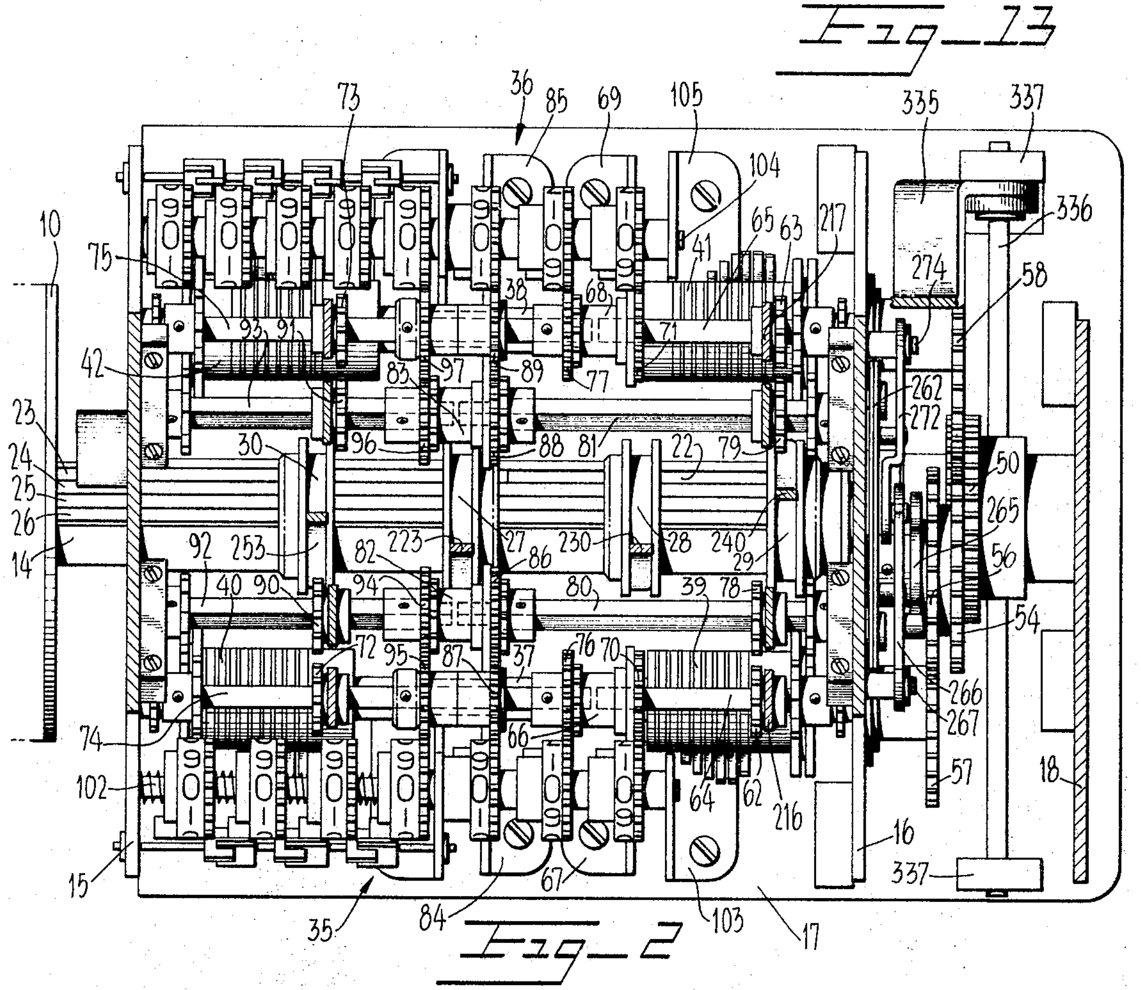
FIG. 2 is a sectional plan view of a postage meter.

As each selection rack 170, 171, 172 and 173 is differentially positioned, in accordance with a depressed value key in the corresponding ordinal row of keys, means are similarly adjusted to control a like differential adjustment of the selection gears, and the adjustment of the value type-wheels in the print-head 10 to print position. For this purpose, the selection rack 170 carries a bifurcated lateral extension 209 (FIG. 14) with a bifurcation therein embracing a pin 210 secured adjacent one end of a T-bar 211 of a slide 212 mounted for longitudinal movement on the top surface of a bracket 213 secured at its respective ends to end frames 15 and 16, intermediate frame members 143 and 144 (FIGS. 8 and 14). A pair of pins 214 carried on bracket 213 serve by engagement with aligned, elongated slots 215 to guide slide 212 in its longitudinal movement. At its respective ends, the T-bar 211 is provided with downwardly extended yokes 216 and 217 engaged in suitable annular grooves in the hub of the respective selection gears 62 and 63 (FIG. 2). At its opposite end, the slide 212 is provided with a lateral extension 221 upon which an angularly downwardly extended guide member 222 is secured, having its lower end 223 arcuately formed and positioned between the annular flanges of collar 27.

In order to control the differential adjustment of selection gears 72 and 73 for the registration of a units of cents value in the ascending and descending registers 35 and 36 and the adjustment of the units of cents type-wheel in print-head 10, a slide 224 is supported adjacent the lower surface of the bracket 213 and is guided for endwise movement thereon by pins engaged in suitable elongated slots in the slide 224, similarly to the pins 214 and slots 215 in slide 212. At its left end (FIG. 14), the slide 224 carries a T-bar element 225 having disposed at each end thereof downwardly extended yokes 226 and 227, engaged in annular grooves of the hubs of respective selection gears 72 and 73 (FIG. 2). Extending laterally from one longitudinal edge of slide 224 and upwardly at a right-angle thereto, is a bifurcated arm 228, having the bifurcation therein embracing the pin 196 on the units of cents selection rack 171, as seen in FIG. 8. The arm 228 carries an angularly downwardly disposed guide member 229 secured thereon and having its lower end 230 arcuately formed for engagement between the two annular flanges of collar 28 (FIG. 2).

For the registration of a selected postage value in the tens of cents order dials of the ascending and descending registers 35 and 36 and for a like adjustment of the tens of cents value type-wheel in the print-head 10, a slide 234 is mounted for endwise movement on one vertical face of a bracket 235 secured at its respective ends to end frame members 15 and 16 intermediate side frame members 143 and 144 and below bracket 213, as seen in FIG. 4. Slide 234 is guided in its endwise movement on the bracket 235, similarly to slide 212 on bracket 213, by means of pins engaging in suitable elongated slots in the slide. A laterally disposed right-angle projection 236 formed on the right-hand end of slide 234 (FIG. 14) supports a yoke bar 237 secured thereon and extending equally each side of bracket 235 in a horizontal plane. At its respective ends, bar 237 carries downwardly extended yokes 238 and 239, disposed in alignment in a plane at right-angles to the bracket 235 and engaged, respectively, in annular grooves in the hubs of selection gears 78 and 79. An arcuate tongue or guide 240 extends downwardly from the lower longitudinal edge of the slide 234 adjacent the right-end thereof and is adapted to engage between the annular flanges of collar 29, to control the adjustment of the tens order type-wheel of print-head 10 (FIG. 2). To control the adjustment of the slide 234, a bifurcated offset arm 241 extends angularly upwardly from the top edge of the slide 234 having the bifurcation therein engaged with pin 197 on selection rack 172, as seen in FIG. 8.

A pair of pins 244 are secured on the face of the bracket 235, opposite the disposition of the slide 234, and are engaged in aligned elongated slots 245 in a slide 246 to guide the slide in endwise movement on bracket 235. Slide 246 carries a laterally offset extension 247 having a bifurcation 248 in the vertically extended end portion thereof for engagement with pin 198 on selection rack 173. A right-angle lateral extension 249 of slide 246 carries a yoke bar 250 secured thereon, having disposed at its respective ends downwardly extending yokes 251 and 252 aligned in a plane at right-angles to bracket 235 and engaged in annular grooves in the hubs of respective selection gears 90 and 91 (FIG. 2). Extending downwardly from the lower edge of the slide 246 adjacent the left-end thereof (FIG. 14) is an arcuate tongue or guide 253 adapted to engage between the annular flanges of the collar 30.

Upon the differential adjustment of each of the selection racks 170, 171, 172 and 173 in accordance with the value represented by a depressed value key 110 in each of the respective ordinal rows of keys, the value represented by the adjustment of each rack is registered in the corresponding indicator dial 111. Immediately upon initiation of a cycle of meter operation, each of the selection racks is locked in its adjusted or nonadjusted position. For this purpose, the extended right end portions 257, 258, 259 and 260 of the respective selection racks 170, 171, 172 and 173, is provided along its lower edge with a series of sawteeth 261 (FIGS. 4, 7 and 14). Following a differential adjustment of one or more of the selection racks 170–173, and immediately upon initiation of a cycle of meter operation, a detent bar 262 (FIGS. 2, 3, 4, 12 and 13) is moved upwardly in a parallel motion with respect to the lower edge of the selection rack extensions 257–260 to engage the knife-like top edge thereof between aligned teeth 261 of the selection racks in either the adjusted or nonadjusted positions of the racks. To this end, detent bar 262 is provided adjacent each end thereof with a vertical slot 263 engaging corresponding pins 264 carried by end frame member 16 to guide the bar 262 in its parallel movement from the normally inactive to the active position. A cam 265 is secured on the hub supporting gears 54 and 56, rotatable therewith on shaft 55, and cooperating with cam 265 is a cam follower bellcrank 266 rockably mounted on a pin 267, secured on end frame member 16. At its lower end, one arm of bellcrank 266 carries a roller 268 in contact with cam 265. The other arm 269 of bellcrank 266 is provided adjacent its free end with a horizontally disposed slot 270 (FIG. 12) engaging a pin 271 secured on the end portion of one arm 272 of a bellcrank 273, rockably mounted on a pin 274 carried by end frame member 16.

In the normal full-cycle, or "at rest," condition of the postage meter and the normally inactive position of detent bar 262, the roller 268 is engaged with the left-hand end portion of the arcuate cam 265, as seen in FIG. 12, and by virtue of the pin-and-slot connection 271, 270, the arms 269 and 272 of respective bellcranks 266 and 273 are disposed in an aligned horizontal plane. At this time, a spring 275 is under tension, supported at its one end in the lower end of the depending arm of bellcrank 273 and, at its other end, on a suitable pin carried on end frame member 16. Immediately following the initiation of a cycle of meter operation, and, therefore, a counter-clockwise rotation of the cam 265 (FIG. 13), spring 275 becomes effective to impart a clockwise rocking movement to the bellcrank 273, which, through the pin-and-slot connection 271 and 270, imparts a counter-clockwise rocking movement to bellcrank 266, as the cam 265 is rotated out of engagement with roller 268. In order to control the parallel motion of the detent bar 262, with the rocking of the bellcranks 266 and 273, pins 276 and 277 are secured on the respective arms 269 and 272 of the corresponding bellcranks 266 and 273 and are engaged in horizontally disposed slightly elongated slots in the detent bar 262.

Referring now to FIGS. 4 and 8, the value represented by a depressed key is indicated in dials 111, there being a dial 111 associated with each ordinal row of keys 110. The right end extension 257, 258, 259 and 260 of the respective selection racks 170, 171, 172 and 173 is provided along its top edge with a series of teeth 282 engaged with a corresponding pinion 283 rotatable on shaft 284 journalled at its respective ends in side frame members 143 and 144. Each pinion 283, in turn, is enmeshed with a corresponding idler gear 285, which is enmeshed with a pinion 286 integrally formed on, and concentric with, the corresponding ordinal indicator dial 111 rotatable on a shaft 287 secured at its ends in side frame members 143 and 144. Idler gears 285 are rotatably supported on the shaft 166 adjacent dials 111.

As seen in FIGS. 8 and 9, each of the pinions 283 is secured to respective sleeves 288 rotatable on shaft 284, each of the sleeves 288 having an angular portion thereof extending axially parallel with the shaft 284. Associated with each sleeve 288 is a collar 289, secured on shaft 284 and having an arcuate portion thereof extended axially parallel with the shaft, thereby forming a lost motion coupling between the shaft 284 and the pinion 283 in each keyboard order. It will be noted that as each pinion 283 effects rotation of a corresponding ordinal indicator dial 111 in a clockwise direction, as viewed from the bottom in FIGS. 8 and 9, from the "0" indicating position to the, "1" indicating position, the leading edge of the extension of sleeve 288 of the pinion will engage the opposed edge of the extension of collar 289 for a purpose now to be described.

It will be recalled that, upon depression of a value key in one or more keyboard orders, the key becomes latched in its depressed position and the corresponding key-latching slide 131, becomes locked against movement to release the depressed key. When it becomes desirable to change the values set in the keyboard, a "CLEAR" key 292 (FIGS. 1 and 4) must be depressed. Upon depression of the "CLEAR" key, the ordinal lock bars 151 are restored to their inactive position, the key latching slides 131 are moved to release the previously depressed keys and the ordinal selection racks 170–173 are returned to their normally latched position, thereby returning the associated ordinal indicator dials 111 to the "0" registering position.

Key stem 293 of the "CLEAR" key 292 is mounted for vertical endwise movement by the engagement of suitable slots therein (not shown) with pins 294 secured on end frame member 15 and is normally urged upwardly to the position shown in FIG. 4 by a spring 295. The lower end of the key stem 293 extends through a suitable aperture in the top cover 46 of the base portion 12 of the machine, overlying the upper laterally extended end of a switch actuating slide 296 which is supported for vertical endwise movement by the engagement of suitable elongated slots therein (not shown) with pins 297 secured on frame member 45 of base portion 12. Normally, slide 296 is urged upwardly to the position shown in FIG. 4 by means of a spring 298. At its lower end, the slide 296 is formed at a right angle to the slide overlying the contact control member of the normally open microswitch 302, secured on the base plate 47 of the base portion 12. Upon closure of microswitch 302, a solenoid 303 (FIGS. 4 and 15) becomes energized to effect engagement of a conventional single cycle clutch, generally indicated at 304. For this purpose, a clutch-engaging pawl 305 is pivotally mounted on a pin 306 secured on the frame member 45. The laterally extended lower end portion of the depending arm of clutch-engaging pawl, or lever, 305 is connected to the one end of the armature of the solenoid 303. In the normal de-energized state of solenoid 303, a spring 307 urges pawl 305 in a clockwise direction (FIG. 15) to effect the engagement of the hooked upper end portion 308 of the pawl with a tooth 309 formed in the peripheral edge of clutch-engaging disk 310 to maintain clutch 304 disengaged.

The driving element 314 of clutch 304 is secured on motor-driven shaft 43, while the driven element 315 of the clutch is secured on one end of a sleeve 316 having a cam 317 secured thereon at its other end freely mounted on shaft 43. Associated with cam 317 is a cam follower lever 318 rockably supported on a pin 319 secured on the web face of the right-angular end portion 320 of a channelled bracket 321 secured to the inner surface of frame member 44 at a right angle thereto. One arm of cam follower 318 carries a roller 322 engaging the peripheral edge of the cam 317. The end portion of the other arm of the cam follower 318 is formed at a right angle thereto and supports a barrel-shaped roller 323 engaged in a bifurcation in the end of one arm 324 of a bellcrank 325, rockably mounted on a pin 326 secured on the web face of bracket 321. At its lower end, a second arm 330 of the bellcrank 325 supports one end of a spring 331 the other end of which is supported on a pin 332 secured on and projecting downwardly from, the lower flange of the channelled end portion 320 of bracket 321. The other, or third arm, 333 of the bellcrank 325 is provided at its upper end with two teeth 334. Spring 331 serves to retain roller 322 of cam follower 318 in engagement with the peripheral edge surface of the cam 317 and, in the normal full-cycle position of the clutch 304, bellcrank 325 is in the position shown in FIG. 4.

Upon engagement of clutch 304 and following approximately sixty degrees of angular rotation of cam 317 in a clockwise direction (FIG. 15) cam follower 318 is rocked clockwise to rock bellcrank 325 counter-clockwise (FIG. 4). As bellcrank 325 is rocked counter-clockwise, an angular rocking movement is imparted to a lever arm 335 (FIGS. 2, 8 and 16) secured on a shaft 336 journalled at its respective ends in brackets 337 secured on meter base 17. For this purpose, lever arm 335 is provided at its lower extremity with a single-tooth 338 engaged between teeth 334 on bellcrank 325. At the upper extremity of an offset end portion of lever 335, an arcuate rack, or toothed sector, 339, is formed, the teeth of which are enmeshed with a gear 340 secured on shaft 284. Thus, it can be seen that upon the depression of the "CLEAR" key 292 and the engagement of the clutch 304, the rocking of bellcrank 325 and, therefore, lever arm 335 imparts a clockwise rotation to shaft 284 (FIG. 16) and a counter-clockwise rotation to each collar 289 secured on shaft 284, as viewed from the bottom in FIGS. 8 and 9. Thereupon, each collar 289 imparts rotation to the corresponding pinions 283 to restore each differentially adjusted selection rack 170, 171, 172 and 173 to the normally latched position thereof shown in FIGS. 4 and 14.

During a cycle of operation of clutch 304 and immediately following the disengagement of an effective stop member of the series of stop members 178 to 186, in each keyboard order with a depressed key 110 in each ordinal row of keys, means become effective to restore the lock bars 151 to their raised, or normally inactive, position, as seen in FIG. 10, and to move each key latching slide 131 to the right (FIG. 7) thereby releasing the depressed key.

Referring to FIGS. 8, 9, 10, 11 and 16, it will be recalled that upon depression of a value key 110, the associated latching slide 131 is moved to the right releasing the corresponding lock bar 151 for downward movement into blocking relationship with the slide. At this time, the top edge 164 of the vertical slot in the lock bar 151 engages the top edge of the arm 165 pivotally mounted on shaft 166. Intermediate its length, each arm 165 normally rests on the flattened portion of a corresponding cam 344 secured on shaft 284, so that upon clockwise rotation of gear 340 and shaft 284 in FIG. 16, or counter-clockwise as seen in FIG. 11, cam 344 becomes effective to rock arm 165 clockwise to the position shown in phantom line, thereby restoring the corresponding lock bar 151 to the position shown in FIG. 10.

In timed relation to the restoration of the actuated lock bars 151, means are brought into play to move the corresponding key latching slides 131 to the right to release the depressed keys 110. For this purpose, a bellcrank 345 is pivotally supported on a pin 346 carried by the offset end portion of the lever arm 335 (FIG. 16). At its lower end, one arm of the bellcrank 345 has a lateral extension supporting one end of a spring 347, which, at its other end, is supported on a right-angle extension of lever arm 335. Normally, spring 347 resiliently retains bellcrank 345 in the counter-clockwise rocked position shown in FIG. 16, wherein one edge of one arm of the bellcrank is engaged with the lateral extension of the offset end portion of the lever arm 335. At the free end of the other arm of the bellcrank 345, a nose 348 is formed which becomes effective, following the initial counter-clockwise rocking movement of the lever arm 335, to engage the lower end of an arm 349 secured on shaft 160 rocking the arm 349 and shaft 160 clockwise against the urgency of a spring 350.

A series of arms 351 (FIGS. 4, 9 and 10) are secured on shaft 160, one such arm for each ordinal row of keys 110, having their lower dependent ends engaged in rectangular slots 352 of corresponding key-latching slides 131. Thus, it can be seen that, as the arm 349 is rocked clockwise in FIG. 16 to impart a similar rocking movement to shaft 160, each of the arms 351 moves the corresponding key-latching slide 131 to the right (FIG. 9) to release the depressed keys 110. Immediately following a cycle of rotation of clutch 304, bellcrank lever arm 335 is restored to the normally inactive position shown in FIG. 4 under the influence of spring 331. It can be seen that, as the lever arm 335 rocks counter-clockwise (FIG. 16), the nose 348 rocks arm 349 and moves beyond releasing the arm 349 to the influence of its spring 350 for return of the arm to its inactive position abutting limit pin 353. Therefore, as lever 335 is returned to the inactive position shown in FIG. 16, the nose 348 of bellcrank 345 engages the end of the arm 349 causing bellcrank 345 to yield against the influence of its spring 347.

What is claimed is:

1. A value entering mechanism for a postage meter comprising,

- a keyboard including a frame structure,
- depressible value keys disposed in ordinally arranged rows and having stems extending slidably through said frame structure,
- means for latching a selectively depressed key in each row in depressed position,
- a locking means movable from an inoperative to an operative position to prevent release of said latching means,
- means biasing said locking means to operative position,
- means normally operable to retain said locking means in the inoperative position and adjustable by said latching means to enable operation of said biasing means upon selective depression of a key,
- a restore means operable to return said locking means to the inoperative position, to release said latching means and to enable operation of said retaining means, and
- a manually operable control means for effecting operation of said restore means.

2. In a mechanism of the character described in claim 1 wherein said latching means comprises a series of latch slides, one for each ordinal row of keys movable in one direction by the selective depression of a key in a corresponding row of keys to effect adjustment of said retaining means, and

- a resilient means normally urging said slides in the other direction to latch a key in each ordinal row in depressed position.

3. In a mechanism of the character described in claim 2 wherein said locking means comprises a plurality of slidable bars, one for each of said slides normally maintained out of the path of travel of said slides by said retaining means.

4. In a mechanism of the character described in claim 3 wherein said retaining means comprises a series of ordinally arranged latch arms, each of said latch arms normally engaging the corresponding one of said slidable bars to retain said bars out of blocking relationship with said latch slides and adapted to be disengaged from said bars by said latch slides upon movement of said slides in said one direction and to enable operation of said biasing means.

5. In a mechanism of the character described in claim 4 wherein said biasing means comprises a torsion spring for each slidable bar operable to bias each of said bars into blocking relationship with the corresponding one of said latch slides upon release of the associated one of said latch arms and to effect reengagement of said latch arms with said slidable bars upon operation of said restore means.

6. In a mechanism of the character described in claim 5 wherein said restore means comprises a first shaft and a second shaft rockably supported in said frame structure,

- a power operated means enabled by said manually operable means to rock said first shaft and said second shaft,
- means carried by said first shaft rockable therewith to move said latch slides in said one direction to release selectively depressed keys,
- a series of cams carried by said second shaft, and
- a cam follower for each of said cams operable upon operation of said power operated means to restore said slidable bars to the normally inactive position in timed relation to the operation of said rockable means.

7. In a mechanism of the character described in claim 6 wherein said power operated means comprises a gear sector rockable to and fro,

- a gear secured on said second shaft enmeshed with said gear sector,
- an arm secured on said first shaft,
- a spring means for resiliently maintaining said arm in an inoperatively rocked position,
- a yieldable pawl associated with said gear sector operable upon rocking of said sector to engage said arm to control the rocking of said first shaft in timed relation to the rocking of said second shaft, and
- a cyclically operable actuating means enabled by said manual control means to control the rocking of said gear sector.

8. In a mechanism of the character described in claim 7 wherein said cyclically operable actuating means comprises a cyclic clutch,

- a cam driven by said clutch upon engagement thereof,
- a lever controlled by said cam for actuating said gear sector, and
- means enabled by said manually operable control means for effecting engagement of said clutch.

9. A value entering mechanism for a postage meter comprising,

- a keyboard including a frame structure,
- value keys disposed in ordinally arranged rows and having stems extending slidably through said frame structure, each of said key stems in each row having a camming element formed thereon,
- a key latching bar for each ordinal row of keys movable in one direction by a said camming element of a selected value key upon depression thereof, a resilient means normally urging each of said latching bars in the other direction to retain a depressed key in the corresponding row of keys in its depressed position, a selection means associated with each ordinal row of keys disposed below said frame structure and longitudinally displaceable differentially from a normal zero representative position to a value representative position in accordance with a selectively depressed key in the corresponding row of keys, a latch means for each of said selection means normally operable to retain each selection means in the zero representative position and releasable by the corresponding one of said ordinal latching bars upon movement thereof in said one direction, a power means for effecting a differential displacement of each of said selection means upon release of a corresponding one of said latch means, a plurality of ordinal dials for indicating the value represented by each depressed key, means controlled by each of said selection means for effecting an indication in said dials, a series of ordinal locking slides, one for each of said latching bars movable from a normally inoperative to an operative position to prevent movement of said latching bars in said one direction, means normally engaging said locking slides to retain said slides in the inoperative position and disengageable therefrom by movement of said latching bars in said one direction upon selective depression of a corresponding ordinal key, means biasing said engaging means into engagement with said locking slides and operable upon disengagement of said engaging means to move said locking slides to operative position relative to said latching bars, a restore means for returning said locking slides to the inoperative position, moving said key latching bars in said one direction to release each depressed key and effecting operation of said controlled means to move said selection means to the zero representative position for engagement by said latch means, a power operated means for controlling operation of said restore means, a manually operable key, and a cyclically operable means enabled by said manually operable key to effect operation of said power operated means.

10. In a mechanism of the character described in claim 9 wherein said selection means comprises a series of ordinally arranged racks, each said rack including a plurality of stop members, one for each key in an ordinal row of keys adapted to engage the corresponding key stem upon selective depression of a key and the release of said latch means to enable operation of said power means.

11. In a mechanism of the character described in claim 10 wherein said power means comprises a spring, one for each of said racks operable upon release of said latch means to effect displacement of said racks and the operation of said controlled means by said racks.

12. In a mechanism of the character described in claim 11 wherein said controlled means comprises a first shaft rockably supported in said frame structure, a plurality of gears, one for each of said racks engaged therewith and rotatable in one direction on said first shaft to control adjustment of the corresponding one of said ordinal dials to a value representative position, and a series of drive members secured in an ordinal arrangement on said first shaft and connectible with a corresponding one of said gears for rotation of said gear in the other direction to return the associated rack and ordinal dial to the zero representative position upon operation of said restore means.

13. In a mechanism of the character described in claim 12 wherein said restore means comprises a plurality of ordinally arranged cams secured on said first shaft, a cam follower arm for each of said cams operable to return said locking slides to the inoperative position for engagement by said retaining means, a second shaft rockably supported in said frame structure, a key release arm for each of said key latching bars secured on said second shaft operable upon rocking of said second shaft to move said latching bars in said one direction to release the depressed keys in each order, and means rockable by said power operated means for controlling the rocking of said first shaft to enable said drive members to return each displaced rack to the zero representative position and to enable said cams to operate said cam follower arms, and means operated by said rockable means for rocking said second shaft to enable operation of said key release arms in timed relation to the operation of cam follower arms.

14. In a mechanism of the character described in claim 13 wherein said rockable means comprises a gear carried by said first shaft, and a gear sector engaged with said gear and rockable by said power operated means to effect the rocking of said first shaft and operation of said operated means.

15. In a mechanism of the character described in claim 14 wherein said operated means comprises an arm carried by said second shaft, and a yieldable pawl mounted on said gear sector rockable therewith and engageable with said arm to control rocking of said second shaft.

References Cited

UNITED STATES PATENTS

| | | | |
|---|---|---|---|
| 1,810,399 | 6/1931 | Horni | 235—27 |
| 1,900,103 | 3/1933 | Gubelmann | 235—27 |
| 2,052,485 | 8/1936 | Ogden | 235—101 |
| 2,451,090 | 10/1948 | Johnson | 235—27 |
| 2,715,498 | 8/1955 | Tenoort et al. | 235—27 X |
| 3,024,988 | 3/1962 | Wagemann | 235—27 X |

RICHARD B. WILKINSON, Primary Examiner

S. A. WAL, Assistant Examiner

U.S. Cl. X.R.

235—27, 145